(12) United States Patent
Kehrmann et al.

(10) Patent No.: US 12,246,364 B2
(45) Date of Patent: Mar. 11, 2025

(54) TREATMENT OF MILL SCALE CONTAINING HYDROCARBONS

(71) Applicant: amaTEQ Holding GmbH, Münster (DE)

(72) Inventors: Alexander Kehrmann, Münster (DE); Nico W. Scheeres, Boca Raton, FL (US)

(73) Assignee: AMATEQ HOLDING GMBH, Münster (DE)

( * ) Notice: Subject to any disclaimer, the term of this patent is extended or adjusted under 35 U.S.C. 154(b) by 177 days.

(21) Appl. No.: 18/003,255

(22) PCT Filed: Jun. 25, 2021

(86) PCT No.: PCT/EP2021/067498
§ 371 (c)(1),
(2) Date: Dec. 23, 2022

(87) PCT Pub. No.: WO2021/260181
PCT Pub. Date: Dec. 30, 2021

(65) Prior Publication Data
US 2023/0226581 A1    Jul. 20, 2023

(51) Int. Cl.
| | | |
|---|---|---|
| *C10B 1/10* | (2006.01) | |
| *B01D 5/00* | (2006.01) | |
| *B01D 46/00* | (2022.01) | |
| *B01D 47/06* | (2006.01) | |
| *B01D 50/60* | (2022.01) | |

(Continued)

(52) U.S. Cl.
CPC .............. *B09B 3/40* (2022.01); *B01D 5/0072* (2013.01); *B01D 46/003* (2013.01); *B01D 47/06* (2013.01); *B01D 50/60* (2022.01); *C10B 1/10* (2013.01); *C10B 47/30* (2013.01); *C10B 53/00* (2013.01); *C10G 1/02* (2013.01)

(58) Field of Classification Search
None
See application file for complete search history.

(56) References Cited

U.S. PATENT DOCUMENTS

| | | | | |
|---|---|---|---|---|
| 4,085,030 A | * | 4/1978 | Green | C10B 49/20 208/417 |
| 4,102,773 A | * | 7/1978 | Green | C10B 49/20 201/22 |

(Continued)

FOREIGN PATENT DOCUMENTS

WO    9517982 A1    7/1995

OTHER PUBLICATIONS

International Preliminary Report on Patentability, issued Dec. 13, 2022 for PCT/EP2021/067498, 7 pages.

*Primary Examiner* — Jonathan Luke Pilcher
(74) *Attorney, Agent, or Firm* — Seed IP Law Group LLP

(57) ABSTRACT

The present invention is directed to a unit and/or process for treating mill scale containing hydrocarbons, which improves emission levels and allows better control of the temperature during the heating stage. The unit and/or process comprises an indirect-fired rotary thermal reactor (2), a pre-treatment duct (18), a two-stage recovery unit wherein the first stage comprises an oil recovering assembly (4) and the second stage comprises an oil and water condensing unit (6), a coalescing oil filtration system (8) and a reactor combustion chamber (17) for recycled fuel.

20 Claims, 3 Drawing Sheets

(51) Int. Cl.
*B09B 3/40* (2022.01)
*C10B 47/30* (2006.01)
*C10B 53/00* (2006.01)
*C10G 1/02* (2006.01)

(56) References Cited

U.S. PATENT DOCUMENTS

| | | | | |
|---|---|---|---|---|
| 4,244,779 | A * | 1/1981 | Nieminen | C10B 49/16 |
| | | | | 162/30.1 |
| 4,284,616 | A * | 8/1981 | Solbakken | C10B 53/07 |
| | | | | 201/2.5 |
| 4,311,670 | A * | 1/1982 | Nieminen | F23G 5/30 |
| | | | | 422/143 |
| 4,583,468 | A * | 4/1986 | Reed | C10G 1/02 |
| | | | | 432/106 |
| 5,423,891 | A * | 6/1995 | Taylor | C10J 3/12 |
| | | | | 48/209 |
| 6,203,765 | B1 * | 3/2001 | Taciuk | B01J 19/28 |
| | | | | 422/204 |
| 6,657,095 | B1 * | 12/2003 | Holden | C10G 1/10 |
| | | | | 202/99 |
| 2003/0027088 | A1 * | 2/2003 | Ueno | B01J 20/20 |
| | | | | 431/4 |
| 2003/0136747 | A1 * | 7/2003 | Wood | F26B 25/006 |
| | | | | 210/806 |

* cited by examiner

TREATMENT OF MILL SCALE CONTAINING HYDROCARBONS

FIELD OF THE INVENTION

The present invention is directed to a unit for treating oily mill scale and sludge produced in the steel rolling mill. This oily mill scale is considered to be hazardous. The present invention is further directed towards a process for the treatment of mill scale from the steel rolling mill containing contaminants including hydrocarbons. In particular, the invention is directed towards separating and recovering iron oxides, oil and water from mill scale. In the present invention, further useful compounds can be recovered from the mill scale. The iron oxides, oil and water, as well as other useful compounds, are recovered by the herein described unit and/or process. The recovered materials are suitable for re-use in industrial processes.

BACKGROUND OF THE INVENTION

Various processes in steel plants result in the by-product mill scale. Mill scale is a steel waste which comprises valuable iron oxides, as well as oils and greases (also referred to as hydrocarbons or oil) and water. These hydrocarbons can, for example, be a result of contamination of the mill scale by lubricants applied to equipment used in the steel rolling process.

The presence of hydrocarbons prevents the recycling of mill scale in the steelmaking process. One reason for this is that the heating steps involved in the steelmaking process liberate hydrocarbons and their oxides, resulting in high emission levels. As strict air pollution regulations are typically applied, industries must tightly monitor and control their emissions.

One solution has been to avoid recycling the mill scale and to instead remove and dispose of it in, for example, landfills. However, this is an expensive process and further has the disadvantage that the valuable iron oxides contained in the mill scale are lost.

Various processes have been developed in an attempt to recycle the mill scale and recover the valuable iron oxides. These include solvent extraction, water extractions in the presence of surfactants and detergents, as well as kiln processes. Each of these is associated with a variety of disadvantages, such as being expensive, causing high emission levels, and causing operational and environmental problems.

Previously employed kiln processes are associated with a number of disadvantages. These include high energy consumption, high costs and failing to meet acceptable emission levels. Furthermore, they are often associated with the loss of useful material. For example, previously employed kiln processes frequently employ techniques which involve the burning-off of the flue gas, thereby losing the hydrocarbon and water content of the mill scale.

EP 0446779 describes a process for the removal of oil from oil-containing wet mill scale, mill scale sludge and similar substances. The substances are treated in a continuous furnace combined with an iron-ore sintering plant. Hot cooler exhaust air from a sintering cooler flows in a counter-current to the mill scale through the continuous furnace. During this process, the scale is dried and some of the oil is burnt. The cooler exhaust air and the volatile oils are fed into the ignition furnace of a sintering machine, as combustion air and the residual oils are burnt therein.

US 2006/0130611 describes a process for treating an oily mixture consisting of hydrocarbons, solid particles and water. The process includes the steps of placing the oily mixture into a reaction chamber, purging this chamber with an inert gas and creating a steam bath within the purged chamber. The steam surge frees hydrocarbon matter from the solid particles. The process further includes the elevation of the reactor chamber temperature to a boiling point of the hydrocarbons, vaporising the hydrocarbons within the inert atmosphere, venting the chamber and processing the off-gas into a hydrocarbon product. The de-oiled solid particles are discharged from the reaction chamber as a raw material or for disposal.

SUMMARY OF THE INVENTION

It is an object of the present invention to provide an apparatus (a unit) for the treatment of mill scale, which improves emission levels and allows a better control of the temperature during the heating stage.

It is a further object of the present invention to provide a process for the treatment of mill scale, which improves emission levels and allows a better control of the temperature during the heating stage.

The problem to be solved by the present invention is the provision of a unit and/or a process for the treatment of mill scale, which improves emission levels and allows a better control of the temperature during the heating stage.

A solution to the problem involves a unit for the treatment of mill scale containing hydrocarbons, wherein the unit comprises:
 a hopper with a live bottom,
 an indirect-fired rotary multi-zone thermal reactor with at least three different temperature zones,
 a pre-treatment duct comprising an oil spray,
 at least a two-stage vapour recovery unit, wherein
  the first stage comprises an oil recovering assembly comprising an oil-based ejector style scrubber, a coalescing oil filtration unit, an oil mixing tank, a cooling unit, and an oil circulation assembly, and
  the second stage comprises an oil and water condensing unit comprising a water-based ejector style scrubber, a water cooling and circulation assembly and an oil and water collection tank with an oil-water separator;
 a coalescing oil filtration system; and
 a reactor combustion chamber for recycled fuel.

A further solution to the problem involves a process for the treatment of mill scale containing hydrocarbons, wherein the process comprises the following steps:
 i) Addition of the mill scale as a feed material into an indirect-fired rotary thermal reactor (2), wherein the indirect-fired rotary thermal reactor (2) is a multi-zone reactor with at least three different temperature zones;
 ii) Heating the feed material in an oxygen-deficient atmosphere in each of the temperature zones, wherein:
  a. in a first zone (13), the temperature is set to 93-149° C. (200-300° F.);
  b. in a second zone (14), the temperature is set to 149-315° C. (300-600° F.); and
  c. in a third zone (15), the temperature is set to 315-538° C. (600-1000° F.);
 iii) Passing the flue gas from the thermal reactor (2) through a pre-treatment duct (18), wherein the pre-treatment duct (18) comprises an oil spray, wherein the oil spray is at a temperature of 120-150° C. (250-300° F.) and the velocity of the spray is at least 10000 fpm;

iv) Passing the vapour from the pre-treatment duct (18) through a two-stage recovery unit, wherein:
   a first stage comprises an oil recovering assembly (4), the oil recovering assembly (4) comprising an oil-based ejector style scrubber, a coalescing oil filtration unit (5.1), an oil mixing tank (5.2), a cooling unit, and an oil circulation assembly; wherein the vapour from the pre-treatment duct (18) enters the oil-based ejector style scrubber; condensed liquid from the oil-based ejector style scrubber enters the coalescing filtration unit (5.1); and oil separated in the coalescing filtration unit (5.1) enters the oil mixing tank (5.2); and
   a second stage comprises an oil and water condensing unit (6), wherein the oil and water condensing unit (6) comprises a water-based ejector style scrubber, a water cooling and circulation assembly, and an oil and water collection tank (7) with an oil-water separator; wherein vapour from the oil-based ejector style scrubber of the first stage enters the water-based ejector style scrubber of the second stage; and condensed liquid from the water-based ejector style scrubber enters the oil and water collection tank (7);
v) Passing the vapour stream from the water-based ejector style scrubber through a coalescing oil filtration system (8); and
vi) Passing the vapour stream from the coalescing oil filtration system (8) to a combustion chamber (17) of the indirect-fired rotary thermal reactor (2).

The solutions to the present invention are associated with a number of advantageous effects. These include, but are not limited to, the following:
1. Avoiding/reducing the loss of useful material by separately recovering iron oxides, hydrocarbons, water and optionally further useful compounds. These are suitable for re-use.
2. Providing a unit/process for the treatment of mill scale on a commercial scale
3. Improvement in energy efficiency, particularly by using vapour from the process as a supplemental fuel source
4. High range of oils that can be removed
5. Improvement of emission levels, particularly through the proper treatment of vapour stream as well as the reduction of overall fuel usage
6. More environmentally friendly
7. Providing for a continuous process
8. Providing a dynamic and versatile approach

DETAILED DESCRIPTION

Embodiments according to the present invention will now be described in more detail.

Figure 1A:
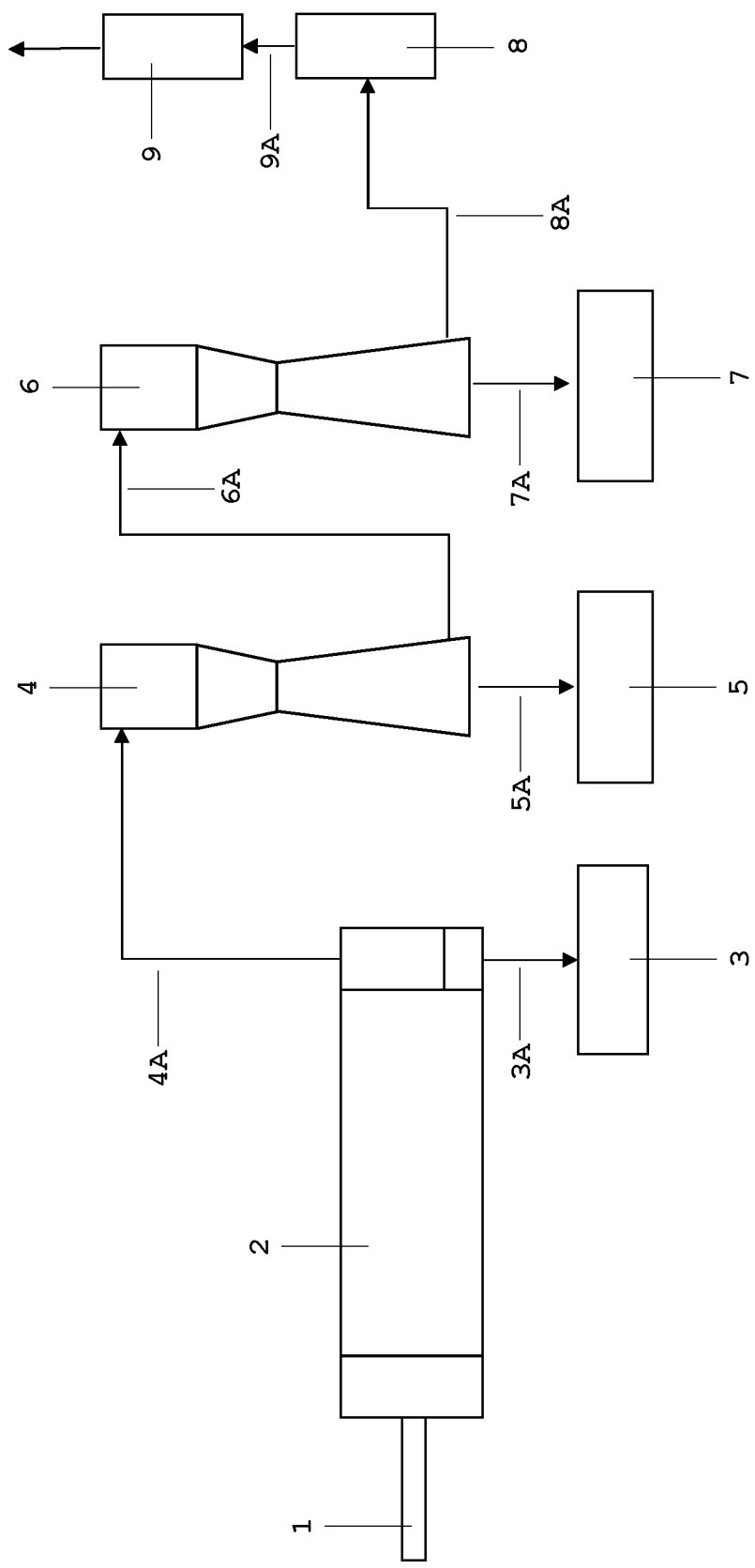
FIG. 1A shows a unit and/or process according to the present invention for the treatment of mill scale containing hydrocarbons.
Figure 1B:
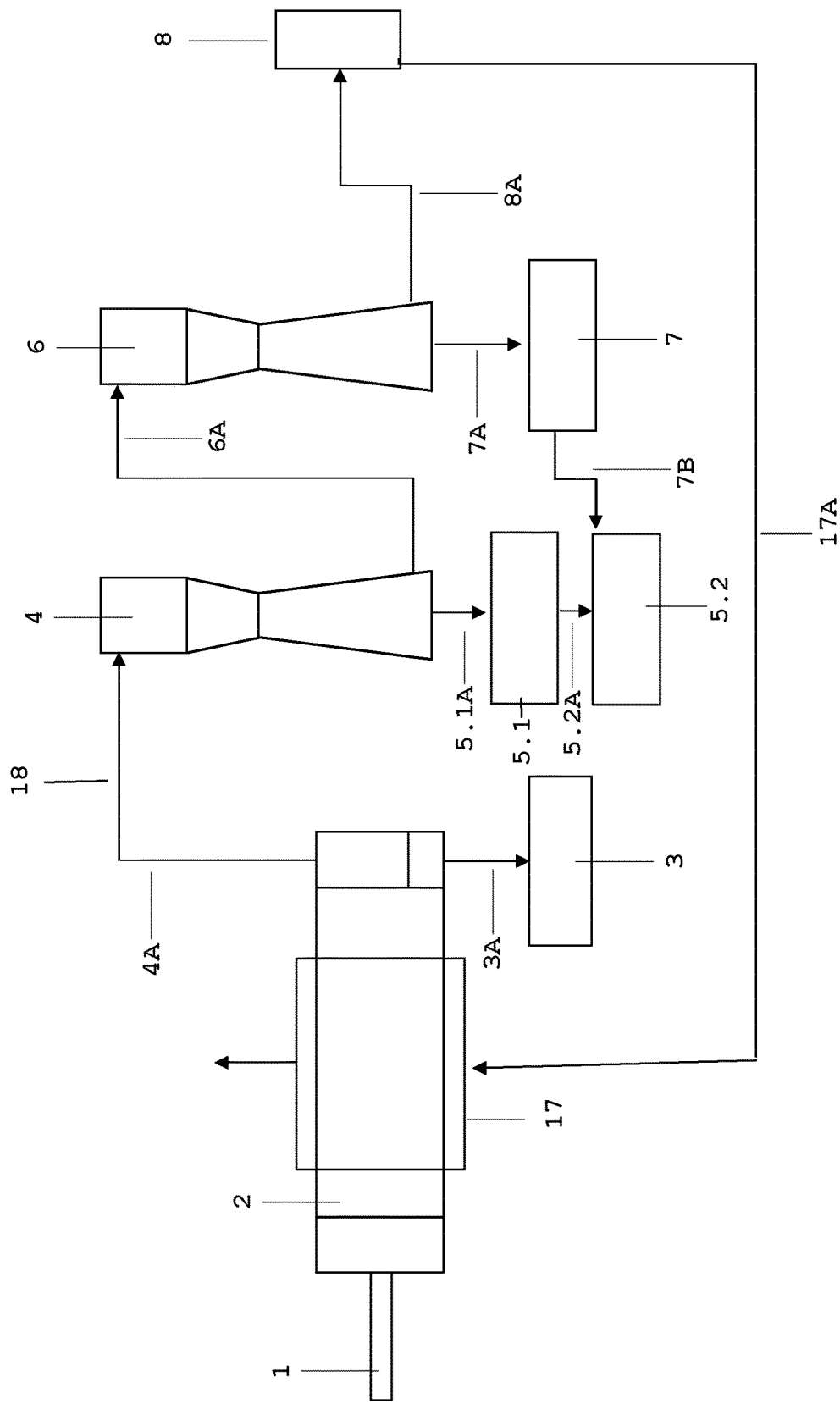
FIG. 1B shows a unit and/or process according to the present invention with additional and/or alternative features for the treatment of mill scale containing hydrocarbons.
Figure 2:
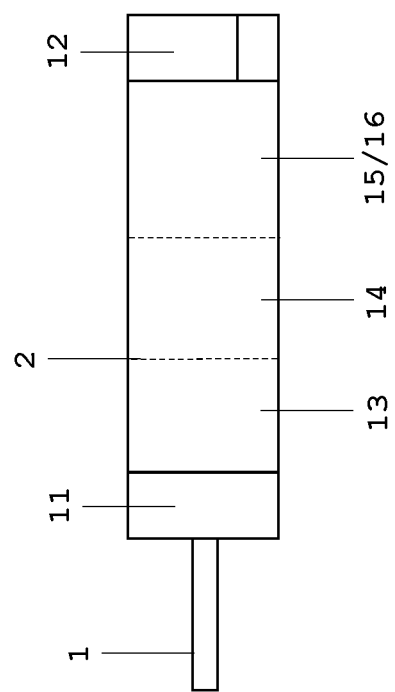
FIG. 2 shows a more detailed illustration of the indirect-fired rotary multi-zone reactor.

A solution to the present invention includes the implementation of a unit for the treatment of hydrocarbon-containing mill scale. FIGS. 1A and 1B provide example set-ups for such a unit (10). FIG. 2 provides a more detailed illustration of the indirect-fired rotary multi-zone thermal reactor.

In one embodiment according to the present invention, a unit (10) for the treatment of mill scale containing hydrocarbons comprises:
   a hopper (1) with a live bottom,
   an indirect-fired rotary multi-zone thermal reactor (2) with at least three different temperature zones,
   a pre-treatment duct comprising an oil spray,
   at least a two-stage vapour recovery unit, wherein
   the first stage comprises an oil recovering assembly (4) comprising an oil-based ejector style scrubber, a coalescing oil filtration unit (5.1), an oil mixing tank (5.2), a cooling unit, and an oil circulation assembly, and
   the second stage comprises an oil and water condensing unit (6) comprising a water-based ejector style scrubber, a water cooling and circulation assembly and an oil and water collection tank (7) with an oil-water separator;
   a coalescing oil filtration system (8); and
   a reactor combustion chamber for recycled fuel (9).

In one embodiment, the disassembled unit (10) according to the invention can be made mobile as the parts fit into a series of shipping containers. This has the advantage that the unit (10) is easily transported to/from a specific job site.

In an embodiment according to the invention, the unit (and/or the process) allows for a high-volume continuous feed processing.

In an embodiment according to the invention, the unit and/or process allows the processing of material on a commercial scale.

In a further embodiment, the unit (10) has an automation direct PLC control system. Preferably the unit (10) will be further furnished with a touch screen HMI for control.

In an embodiment according to the invention, the unit (10) is set up for 460V, 3Ph, 60 Hz. In a preferred embodiment the unit (10) will also have one main transformer converting power to 400c, 4Ph, 50 Hz.

The individual components of the unit (10) according to the present invention will now be described in more detail, including optional and preferred embodiments. The following description of the embodiments is equally applicable to the process according to the present invention.

Feed Hopper (1)

In one embodiment, the feed hopper (1) is preferably equipped with a live bottom feed.

Utilising a hopper with a live bottom feed has the advantage that it avoids flowback of the material. Furthermore, it allows the unit (10) to operate as a closed process.

According to an embodiment of the invention, when the vapour of the process is used as a supplemental fuel source for the indirect-fired thermal reactor (described in more detail further below), a hopper with a live bottom feed can be used to control the feed rate to ensure that a constant amount of oil is fed through the system. The hopper with a live bottom can control the feed being fed into the main reactor based on the oil and moisture content of the sludge. This in turn controls the amount of hydrocarbons and carbon monoxide being used as supplemental fuel, helping with the overall control of temperature and emissions. Feeding the reactor with consistent hydrocarbon levels helps control/reduce emissions as well as improve the overall efficiency of the thermal reactor.

In an embodiment according to the invention, the feed rate can reach up to 7.5 metric tonnes per hour. This has the advantage that large quantities of material can be processed. In an embodiment, the feed rate can be varied from 2.5 to 7.5 metric tonnes per hour. Preferably, the feed rate is from 3.0 to 7.5 metric tonnes per hour. More preferably the feed rate is from 3.5 to 7.5 metric tonnes per hour. Even more preferably the feed rate is from 4.0 to 7.5 metric tonnes per hour. Most preferably the feed rate is from 4.5 to 7.5 metric tonnes per hour.

In an embodiment according to the present invention, the feed hopper (1) is attached to an indirect-fired rotary thermal reactor (2), preferably an indirect-fired rotary multi-zone thermal reactor (2).

In an embodiment the feed hopper (1) feeds material into the indirect-fired rotary thermal reactor (2).

Indirect-Fired Rotary Thermal Reactor (2)

In one embodiment, the feed material enters the indirect-fired rotary thermal reactor ("reactor") (2) via the feed hopper (1).

In indirect-fired rotary thermal reactors, heat is introduced to the outside of a drum containing the material. The heat source is not particularly limited but can include an electrical furnace or a source of combustible materials such as natural gas, waste gas or fuel. Preferably the heat source is an electrical furnace. This has the advantage that it improves the mobility of the unit (10).

According to a preferred embodiment, waste gas from the process according to the invention is used as a supplemental fuel source.

Advantages of the reactor (2) being indirect-fired and rotary include avoiding direct contact between the heat source and the material, providing a better control of the temperatures and allowing the control of the internal processing atmosphere.

In a further embodiment, the feed material enters the system at ambient temperature.

In a preferred embodiment, the material of construction of a reactor (2) is a high temperature alloy.

In another preferred embodiment, the reactor (2) is operated in an oxygen-deficient atmosphere.

In a preferred embodiment, there is no introduction of an inert gas. Instead, the water from the feed material can be used to displace oxygen.

In a preferred embodiment, there is no introduction of an inert gas into the rotary reactor (2).

In an embodiment, the reactor (2) can process material at up to 1000° C. Preferably the material is heated to temperatures of from 399° C. to 510° C.

In a preferred embodiment, the material retention time in the heat zone is at least 30 minutes.

In an embodiment according to the invention, the reactor (2) can be adjusted to manage dwell time (retention time) by adjusting the angle and speed. Adjusting the retention time has the advantage that the removal of all hydrocarbons from the material is ensured. Furthermore, the ability to adjust the retention time has the advantage that there is a large flexibility in the type of material used and the level of remediation achieved. For example, if it is only required for a certain amount of hydrocarbons to be removed, the retention time can be decreased.

In a preferred embodiment, the reactor (2) has a sealed feed assembly (11).

In a preferred embodiment, the reactor (2) has a sealed discharge assembly (12).

In a preferred embodiment, the reactor has a sealed feed (11) and discharge assembly (12). More preferably the reactor (2) has a sealed feed assembly (11) and sealed discharge assembly (12) and air is prevented from entering the system by including airlocks in the feed assembly (11) and discharge assembly (12).

In a preferred embodiment, the reactor (2) is equipped with a sweep gas inlet. Controlled sweep gas can be introduced into the reactor. The sweep gas is preferably steam or nitrogen. Most preferably, the reactor uses moisture from the feed material as a sweep gas.

According to a preferred embodiment of the invention, the indirect-fired rotary thermal reactor (2) is an indirect-fired rotary multi-zone thermal reactor (2) with at least three heat zones. The heat zones ensure hydrocarbons are desorbed and not cracked during the desorption process.

In a preferred embodiment, the reactor is an indirect-fired rotary multi-zone thermal reactor (2), which has at least three heat zones (temperature zones). More preferably, the temperatures in the initial zone(s) are set to vaporise water, followed by setting the temperatures of later zones to vaporise hydrocarbons. Using such a reactor has a number of advantages. One such advantage is that the vaporised water (steam) drives air out of the chamber, creating an inert atmosphere and thus avoiding the need for the introduction of an additional inert gas. A further advantage is that due to the co-current flow of steam, the drum is constantly under a steam blanket, creating an inert atmosphere. A further advantage is that the multi-zone system allows the reactor to increase in temperature as material is moved down the reactor in a continuous process.

In a more preferred embodiment, the indirect-fired rotary multi-zone thermal reactor (2) has three temperature zones, optionally four zones. Even more preferably, in the reactor having at least three heat zones, preferably three zones, optionally four zones, the temperature in zone 1 (13) is set to 93-149° C. (200-300° F.), preferably 93-110° C. (200-230° F.), the temperature in zone 2 (14) is set to 149-315° C. (300-600° F.), preferably 218-243° C. (425-470° F.), the temperature in zone 3 (15) is set to 315-538° C. (600-1000° F.), preferably 349-502° C. (660-935° F.), and optionally, the temperature in zone 4 (16) ranges up to 1002° C. (1835° F.) and preferably is set to 504-1002° C. (940-1835° F.), more preferably 538-982° C. (1000-1800° F.). Setting the temperature of zone 1 (13) to 93-149° C. (200-300° F.), preferably 93-110° C. (200-230° F.), has the advantage that this allows water to be vaporised first, creating a steam blanket and an inert atmosphere. The steam can displace oxygen in the reactor to create an inert atmosphere. Setting the temperature of zone 2 (14) to 149-315° C. (300-600° F.), preferably 218-243° C. (425-470° F.), allows lighter hydrocarbons to be driven off. Setting the temperature of zone 3 (15) to 315-538° C. (600-1000° F.), preferably 349-502° C. (660-935° F.), allows heavier hydrocarbons to be driven off. It is further advantageous having a zone 4 (16) in which the temperature can be set to up to 1002° C. (1835° F.), preferably up to 982° C. (1800° F.), more preferably is set to 504-1002° C. (940-1835° F.) and even more preferably 538-982° C. (1000-1800° F.). This allows synthetic oils to be removed. Optionally, instead of implementing a separate zone 4, zone 3 can be set to up to 982° C. (1800° F.). Using such a reactor has a number of advantages. One such advantage is that the vaporised water (steam) drives air out of the chamber, creating an inert atmosphere and thus avoiding the need for the introduction of an additional inert gas. A further advantage is that due to the co-current flow of steam, the drum is constantly under a steam blanket, creating an inert atmosphere. A further advantage is that the multi-zone system allows the reactor to increase in temperature as material is moved down the reactor in a continuous process.

Heating the material in three, optionally four, different temperature zones, each with the aforementioned temperature ranges, ensures more efficient processing and better quality oil recovery. Applying the temperature zones also has the advantage that more than 95% of hydrocarbons are removed from the mill scale, allowing the processed mill scale to be turned into a feedstock for the steel mill.

In a more preferred embodiment, the material is heated by the shell and lifters configured along the internal walls ensure the most efficient heat transfer.

In an embodiment, the reactor (2) is preferably equipped with a collection unit for the treated mill scale (3). In an embodiment, the treated mill scale is transferred from the reactor (2) to the collection unit (3) via line 3A. In a preferred embodiment, the treated mill scale (i.e., the recovered iron oxides) has an oil content of less than 0.50% and a water content of less than 2%. More preferably, the treated mill scale has an oil content of less than 0.48%, 0.46%, 0.44%, 0.42%, 0.40%, 0.38%, 0.36%, 0.34%, 0.32%, 0.30% or 0.28%. Equally, in a preferred embodiment, the treated mill scale has a water content of less than 1.8%, 1.6%, 1.4%, 1.2% or 1.0%. Each of these oil contents can be combined with each of these water contents.

In another preferred embodiment, the processed material discharges into a container through a double airlock.

In a preferred embodiment, the processed material discharges into a cooling screw through a double airlock. In an embodiment, the clean mill scale is discharged into a cooling screw and stockpiled.

In an embodiment, the flue gas exiting the reactor (2), is not processed by a thermal oxidiser before entering a at least two-stage recovery unit.

According to an embodiment, the flue gas exiting the reactor (2) is processed according to the presently claimed invention and the resulting vapour is used as a supplemental fuel source for the indirect fired thermal reactor (2).

In an embodiment, the flue gas exits the reactor (2) via line 4A and enters a at least two-stage recovery unit.

In an embodiment of the present invention, the flue gas exiting the reactor (2) via line 4A optionally enters a pre-treatment duct (18).

Pre-Treatment Duct (18)

The vapour from the oily mill scale from the reactor (2) optionally enters a pre-treatment duct (18) via line 4A.

The pre-treatment duct (18) comprises an oil spray, preferably a high temperature, high velocity (or high pressure) oil spray. The vapour from the oily mill scale is drafted through the pre-treatment duct (18) with the high temperature, high velocity oil spray. According to a preferred embodiment, the oil spray used in the pre-treatment duct (18) is oil condensed in the oil recovering assembly (4) of the process. Preferably, the temperature of the spray is between 120-150° C. (250-300° F.) and the velocity of the spray is at least 10000 fpm (50.8 m/s). According to an embodiment, the velocity can be achieved by implementing an in-duct venturi spray. Implementing a pre-treatment duct (18) with a high temperature, high velocity oil spray has the advantage that it prevents particulate build-up. The prevention of particulate (or fine particulate) build-up in the ductwork reduces downtime and cleanout time.

According to an embodiment of the invention, the vapour from the pre-treatment duct (18) enters a at least two-stage recovery unit.

Two-Stage Recovery Unit

In an embodiment, the flue gas from the thermal reactor (2) enters the at least two-stage vapour recovery unit via line 4A. If a pre-treatment duct (18) is utilised in the process, then the vapour from the pre-treatment duct (18) enters the at least two-stage vapour recovery unit.

Oil Recovering Assembly (4)

According to an embodiment, the first stage of the at least two-stage vapour recovery unit comprises an oil-based vapour condensing unit (oil recovering assembly) (4) consisting of an ejector style scrubber, a cooling unit, an oil-water separator and an oil circulation assembly.

In a preferred embodiment, the oil recovering assembly (4) removes at least 90% amount of oil from the flue gas. Preferably the oil recovering assembly (4) removes from 90% to 100% of oil from the flue gas, more preferably from 90% to 99% of oil from the flue gas, even more preferably 95% to 99% of oil from the flue gas, and most preferably from 97% to 99% of oil from the flue gas.

In an embodiment, oil is collected in a recirculating tank (oil collection tank) (5). In an embodiment, the oil is transferred from the oil recovering assembly (4) to the oil collection tank (5) via line 5A. In an embodiment, the oil recirculating tank (5) contains the oil-water separator.

According to an embodiment of the invention, the condensed liquid from the ejector style scrubber enters an oil-water separator.

In an embodiment, the separated oil is recirculated through the assembly of the first stage. In a further embodiment, the separated oil is held in a collection tank (5) and then recirculated through the assembly of the first stage. These embodiments have the advantage that the oil can be captured from the flue gas and can subsequently be used as a scrubber liquid to capture more oil from the flue gas entering the scrubber.

Using an ejector style scrubber has the advantage that it will remove suspended particulates, eliminating the need for a dust collector which has the tendency to blind up from oily vapour streams.

In an embodiment, water condensed at this stage of the process is separated in the oil-water separator and transferred to a water collection tank. This has the advantage that the water can be collected and re-used for other processes.

According to an alternative embodiment of the invention, the oil recovering assembly (4) comprises an oil-based ejector style scrubber, a coalescing oil filtration unit (5.1), an oil mixing tank (5.2), a cooling unit, and an oil circulation assembly.

According to an embodiment of the invention, the vapour from the previous stage is treated in the oil recovering assembly (4). Generally, the vapour entering the oil recovering assembly (4) enters an oil-based ejector style scrubber. Condensed liquid from the ejector style scrubber enters a coalescing oil filtration unit (5.1). Oil separated in the coalescing oil filtration unit (5.1) then enters an oil mixing tank (5.2). Remaining vapour in the ejector style scrubber enters a line 6A. This remaining vapour can then be transferred to the second stage, which is an oil and water condensing unit (6).

According to a preferred embodiment, oil is collected in a mixing tank (oil mixing tank (5.2)). In an embodiment, the oil from the coalescing oil filtration unit (5.1) is transferred to the oil mixing tank (5.2) via line 5.2A. In an embodiment, the oil mixing tank (5.2) is used to mix heavier oils separated in the first stage with lighter oils from the second stage oil and water condensing unit (6). The heavy oil from the first stage oil recovering assembly (4) is mixed with the lighter oils from the second stage oil and water condensing unit (6) in the mixing tank (5.2) to improve viscosity, making the oil more pumpable.

In a preferred embodiment, the oil recovering assembly (4) removes at least 90% amount of oil, particularly heavy oils, from the flue gas. Preferably the oil recovering assembly (4) removes from 90% to 100% of oil, particularly heavy oils, from the flue gas, more preferably from 90% to 99% of oil, particularly heavy oils, from the flue gas, even more preferably 95% to 99% of oil, particularly heavy oils, from the flue gas, and most preferably from 97% to 99% of oil, particularly heavy oils, from the flue gas.

In detail, according to an embodiment, the flue gas from the thermal reactor (2) or the vapour from the pre-treatment duct (18), enters the oil-based ejector style scrubber. Oil and sludge are removed from the vapour stream and the condensed liquid from the oil-based ejector style scrubber then enters a coalescing oil filtration unit (5.1) via line 5.1A. The oil and sludge are filtered through the coalescing oil filtration unit (5.1) where sludge is separated and removed from the oil. The remaining oil is pumped to the oil mixing tank (5.2) via line 5.2A. Vapour remaining in the ejector style scrubber enters an oil and water condensing unit (6) via line 6A.

In an embodiment, the collected and separated oil is recirculated through the assembly of the first stage. In a further embodiment, the separated oil is held in the mixing tank (5.2) and then recirculated through the assembly of the first stage by using the oil circulation assembly. These embodiments have the advantage that oil can be captured from the flue gas exiting the reactor (2)/the vapour from the pre-treatment duct (18) and can subsequently be used as a scrubber liquid to capture more oil from the flue gas/vapour entering the oil-based ejector style scrubber.

In an embodiment, the cooling unit is part of the oil circulation assembly. Oil exiting the oil mixing tank (5.2) to be recirculated as scrubber spray will first pass through the cooling unit. The temperature of the oil spray helps to ensure that only heavier oils (and not water) are condensed in the oil recovering assembly (4). Preferably, the cooling unit helps maintain a spray temperature of between 120-150° C. (250-300° F.).

In an embodiment, the flue gas remaining after the first stage enters the second stage via line 6A.

Oil and Water Condensing Unit (6)

In an embodiment, the second stage comprises an oil and water condensing unit (6) consisting of a water-based ejector style scrubber, a water cooling and circulation assembly and an oil-water separator.

The remaining vapour from the first stage oil recovering assembly (4) is drafted to the second stage oil and water condensing unit (6).

In a preferred embodiment, the oil and water condensing unit (6) removes at least 80% amount of water from the flue gas. Preferably the oil and water condensing unit (6) removes from 80% to 100% of water from the flue gas, more preferably from 85% to 99% of water from the flue gas, even more preferably 90% to 99% of water from the flue gas, even more preferably 90% to 97% of water from the flue gas, and most preferably from 90% to 95% of water from the flue gas.

In an embodiment, water is collected in a recirculating tank (oil and water collection tank) (7). In an embodiment, water is transferred from the oil and water condensing unit (6) to the oil and water collection tank (7) via line 7A. In an embodiment, the oil and water recirculating tank (7) contains the oil-water separator.

According to an embodiment of the invention, the condensed liquid from the ejector style scrubber enters an oil-water separator.

In an embodiment, the separated water is recirculated through the assembly of the second stage. This can be achieved with the water cooling and circulation assembly. In a further embodiment, the separated water is held in a collection tank (7) and then recirculated through the assembly of the second stage. These embodiments have the advantage that the water can be captured from the flue gas and can subsequently be used as a scrubber liquid to capture more water from the flue gas entering the scrubber.

In an embodiment, oil condensed at this stage of the process is separated in the oil-water separator and transferred to an oil collection tank. This has the advantage that the oil can be collected and re-used for other processes.

In a preferred embodiment, oil condensed in the water-based ejector style scrubber is separated from water in the oil-water separator in the oil and water recirculating tank (7) and transferred to the oil mixing tank (5.2) via line 7B. This has the advantage that the oil can be collected and re-used for other processes.

According to an embodiment, the lighter oils condensed in the oil and water condensing unit (6) are separated from the water and pumped to the oil mixing tank (5.2), where heavier oils from the first stage scrubber are mixed with the lighter oils. The mixed oil can then be cooled and used as a scrubbing agent for the pre-treatment duct (18) and/or the first stage oil-based scrubbing unit.

In another embodiment, the remaining vapour leaving the two-stage vapour recovery unit optionally enters one or more further scrubbers. In an embodiment, in the absence of one or more further scrubbers, the remaining vapour leaving the two-stage vapour recovery unit enters a coalescing oil filtration system (8) through line 8A.

Optional Further Scrubbers

In a further embodiment, the invention optionally comprises one or more scrubbers. These scrubbers allow and are suitable for the recovery of further useful compounds. The further optional scrubbers can be arranged in any order.

The vapour from the oil and water condensing unit (6) enters such optional scrubbers via a line.

In an embodiment according to the invention, a one or more further scrubber is suitable for the recovery of heavy metals (heavy metal capture system).

In a preferred embodiment, one or more of the scrubbers are optionally equipped with a recirculating tank.

In an embodiment, the vapour leaving the one or more further scrubbers enters a coalescing oil filtration system (8).

Coalescing Oil Filtration System (8)

In an embodiment, the vapour leaving the two-stage vapour recovery unit, enters the coalescing oil filtration system (8) through line 8A.

Implementing the coalescing oil filtration system (8) has the advantage that some of the potential remaining oil vapour in the stream can be removed. This further improves the emission levels.

In an embodiment, the vapour leaving the coalescing oil filtration system (8), enters a thermal oxidiser (9). Alternatively, the vapour leaving the coalescing oil filtration system (8) enters a reactor combustion chamber (17).

Thermal Oxidiser (9)

In an embodiment, the vapour leaving the coalescing oil filtration system (8), enters the thermal oxidiser (9) through line 9A.

Implementing a thermal oxidiser (9) has the advantage that remaining oil in the vapour stream is removed.

In a preferred embodiment, after passing through the coalescing oil filtration system (8) and thermal oxidiser (9), the flue gas contains less than 100 ppm of water and less than 100 ppm of oil. Preferably, after passing through the coalescing oil filtration system (8) and thermal oxidiser (9), the flue gas contains less than 90 ppm of water and less than 90 ppm of oil. More preferably, the flue gas contains less than 80 ppm of water and less than 80 ppm of oil. Even more preferably, the flue gas contains less than 70 ppm of water and less than 70 ppm of oil. Even more preferably, the flue gas contains less than 60 ppm of water and less than 60 ppm of oil. Even more preferably, the flue gas contains less than 50 ppm of water and less than 50 ppm of oil.

In a most preferred embodiment, after passing through the coalescing oil filtration system (8) and thermal oxidiser (9), the flue gas contains from non-detect to 50 ppm of water and from non-detect to 50 ppm of oil. Non-detect is a term well-known to the person skilled in the art and typically refers to a region of below 20 ppm. In a most preferred embodiment, after passing through the coalescing oil filtration system (8) and thermal oxidiser (9), the flue gas contains from 20 ppm to 50 ppm of water and from 20 ppm to 50 ppm of oil.

Reactor Combustion Chamber (17)

In an embodiment according to the invention, the remaining vapour from the coalescing oil filtration system (8), enters a reactor combustion zone of the thermal reactor for recycled fuel (combustion chamber (17)). The vapour can enter the combustion chamber (17) through a line 17A.

Implementing a recycling of vapour to the combustion chamber (17) has the advantage that any oil/remaining hydrocarbons and/or carbon monoxide present in the vapour stream after the coalescing oil filtration system (8), can be used as a supplemental fuel source. Furthermore, it has the advantage that the process is a continuous process. The recycling of the vapour to the combustion chamber (17) oxidises any remaining hydrocarbons and/or carbon monoxide that might have carried over from previous steps in the process.

In an embodiment, the combustion chamber (17) is a vapour recycling and thermal oxidation unit, where vapour is used as supplemental fuel for the indirect-fired rotary multi-zone thermal reactor (2).

In a preferred embodiment, after passing through the coalescing oil filtration system (8) and combustion chamber (17), the flue gas contains less than 100 ppm of water and less than 100 ppm of oil. Preferably, after passing through the coalescing oil filtration system (8) and combustion chamber (17), the flue gas contains less than 90 ppm of water and less than 90 ppm of oil. More preferably, the flue gas contains less than 80 ppm of water and less than 80 ppm of oil. Even more preferably, the flue gas contains less than 70 ppm of water and less than 70 ppm of oil. Even more preferably, the flue gas contains less than 60 ppm of water and less than 60 ppm of oil. Even more preferably, the flue gas contains less than 50 ppm of water and less than 50 ppm of oil.

In a most preferred embodiment, after passing through the coalescing oil filtration system (8) and combustion chamber (17), the flue gas contains from non-detect to 50 ppm of water and from non-detect to 50 ppm of oil. Non-detect is a term well-known to the person skilled in the art and typically refers to a region of below 20 ppm. In a most preferred embodiment, after passing through the coalescing oil filtration system (8) and combustion chamber (17), the flue gas contains from 20 ppm to 50 ppm of water and from 20 ppm to 50 ppm of oil.

The individual components of the unit (10) according to the present invention have been described in detail.

The unit according to the present invention can be used in a process for the treatment of mill scale. The following embodiments further describe a process according to the present invention for the treatment of mill scale containing hydrocarbons. This process allows the recovery of iron oxides, oil and water, as well as other useful compounds. The recycling of oil and carbon monoxide from the process makes use of what would otherwise be a waste product or a pollutant. Overall, it improves process efficiency and reduces $CO_2$ emissions.

In the following description, further embodiments and preferred embodiments for the process according to the present invention are provided.

In an embodiment according to the present invention, a process for the treatment of mill scale containing hydrocarbons comprises the steps of:
i) Addition of the mill scale as a feed material into an indirect-fired rotary thermal reactor (2), wherein the indirect-fired rotary thermal reactor (2) is a multi-zone reactor with at least three different temperature zones;
ii) Heating the feed material in an oxygen-deficient atmosphere in each of the temperature zones, wherein:
   a. in a first zone (13), the temperature is set to 93-149° C. (200-300° F.);
   b. in a second zone (14), the temperature is set to 149-315° C. (300-600° F.); and
   c. in a third zone (15), the temperature is set to 315-538° C. (600-1000° F.);
iii) Passing the flue gas from the thermal reactor (2) through a pre-treatment duct (18), wherein the pre-treatment duct (18) comprises an oil spray, wherein the oil spray is at a temperature of 120-150° C. (250-300° F.) and the velocity of the spray is at least 10000 fpm;
iv) Passing the vapour from the pre-treatment duct (18) through a two-stage recovery unit, wherein:
   a first stage comprises an oil recovering assembly (4), the oil recovering assembly (4) comprising an oil-based ejector style scrubber, a coalescing oil filtration unit (5.1), an oil mixing tank (5.2), a cooling unit, and an oil circulation assembly; wherein the vapour from the pre-treatment duct (18) enters the oil-based ejector style scrubber; condensed liquid from the oil-based ejector style scrubber enters the coalescing filtration unit (5.1); and oil separated in the coalescing filtration unit (5.1) enters the oil mixing tank (5.2); and
   a second stage comprises an oil and water condensing unit (6), wherein the oil and water condensing unit (6) comprises a water-based ejector style scrubber, a water cooling and circulation assembly, and an oil and water collection tank (7) with an oil-water separator; wherein vapour from the oil-based ejector style scrubber of the first stage enters the water-based ejector style scrubber of the second stage; and condensed liquid from the water-based ejector style scrubber enters the oil and water collection tank (7);
v) Passing the vapour stream from the water-based ejector style scrubber through a coalescing oil filtration system (8); and
vi) Passing the vapour stream from the coalescing oil filtration system (8) to a combustion chamber (17) of the indirect-fired rotary thermal reactor (2).

In a preferred embodiment, the process provides iron oxides with an oil content less than 0.50% and a water content less than 2%.

In a preferred embodiment, the indirect-fired rotary thermal reactor has three temperature zones.

In a preferred embodiment, the indirect-fired rotary thermal reactor has four temperature zones, wherein in the fourth zone, the temperature ranges up to 1002° C. (1835° F.), preferably the temperature in the fourth zone is set to 538-982° C. (1000-1800° F.).

In a preferred embodiment, the process utilises vaporised oil and carbon monoxide gained from the process as a supplemental fuel source.

In another preferred embodiment, the feed material is added using a hopper with a live bottom, wherein the feed is fed to the reactor with a constant volume of hydrocarbons.

In a preferred embodiment, the reactor is operated in an oxygen-deficient atmosphere.

In a preferred embodiment, there is no introduction of an inert gas into the process. Specifically, in a preferred embodiment there is no introduction of inert gas into the reactor.

In a preferred embodiment, controlled sweep gas is introduced into the rotary thermal reactor. In a further preferred embodiment, the controlled sweep gas introduced into the rotary thermal reactor is steam or nitrogen.

In a preferred embodiment, the material retention time in the heat zone is at least 30 min.

In a preferred embodiment, the total material retention time is at least 45 min.

In a preferred embodiment, the reactor can process material at up to 1000° C.

In a preferred embodiment, a high temperature alloy is the material of construction of the rotary thermal reactor.

In a preferred embodiment, the reactor has a sealed discharge assembly.

In a preferred embodiment, the reactor has a sealed feed assembly.

In a preferred embodiment, the reactor has a feed assembly and a discharge assembly and air is prevented from entering the system by including airlocks in the feed assembly and discharge assembly.

In a preferred embodiment, the material is processed in an oxygen-deficient atmosphere.

In a preferred embodiment, the material discharges into a container through a double airlock.

In a preferred embodiment, the feed material enters the system at ambient temperature.

In a preferred embodiment, the oil condensed and separated in the first stage is recirculated through the assembly of the first stage.

In a preferred embodiment, the water condensed and separated in the second stage is recirculated through the assembly of the second stage.

In a preferred embodiment, following the two-stage recovery unit, the material passes through one or more further scrubbers.

In a preferred embodiment, following the two-stage recovery unit, the material passes through one or more further scrubbers, wherein one or more of the scrubbers are fitted with a recirculating tank.

In a preferred embodiment, the oil recovering assembly removes at least 90% amount of oil from the flue gas.

In a preferred embodiment, the oil and water condensing unit removes at least 80% amount of water from the flue gas.

In a preferred embodiment, after passing through the coalescing oil filtration system and the reactor combustion chamber for recycled fuel, the flue gas contains less than 100 ppm of water and 100 ppm of oil.

In a preferred embodiment, the oil spray used in the pre-treatment duct is oil condensed in the first stage oil recovering assembly.

Overall, the unit and/or process according to the present invention has a number of advantages. These include but are not limited to an improvement in energy efficiency, a better control of the temperature during the heating stage, the removal of a high range of oils, reduction in the loss of useful materials, improvement in emission levels, allowing the processing of material on a commercial scale, providing a continuous process and providing a dynamic and versatile approach. Furthermore, iron oxides from mill scale containing hydrocarbons are recovered. These recovered iron oxides are suitable for re-use in industry. A further advantage includes the separate recovery of oil and water, which are suitable for re-use. In addition, further useful compounds can be recovered, which are suitable for re-use. The purification of the exhaust gases via a multi-step system including a number of scrubbers, a coalescing oil filtration system and a thermal oxidiser or a reactor combustion chamber for recycled fuel, further provide a more environmentally friendly treatment of mill scale containing hydrocarbons.

REFERENCE SIGNS

10 Unit
1 Feed hopper
2 Indirect-fired rotary thermal reactor
3 Collection tank for treated mill scale
3A Line
4 Oil recovering assembly
4A Line
5 Oil collection tank
5A Line
5.1 Coalescing oil filtration unit
5.1A Line
5.2 Oil mixing tank
5.2A Line
6 Oil and water condensing unit
6A Line
7 Oil and water collection tank with oil-water separator
7A Line
7B Line
8 Coalescing oil filtration system
8A Line
9 Thermal oxidiser
9A Line
11 Feed seal assembly
12 Discharge seal assembly
13 Zone 1
14 Zone 2
15 Zone 3/4
17 Combustion chamber
17A Line
18 Pre-treatment duct

EXAMPLE

A unit and a process of treating mill scale according to the present invention are exemplified in the following example.

Mill scale was analysed for its percent composition. The content of the oxides was determined utilising inductively coupled plasma atomic emission spectroscopy (ICP-AES). The moisture content was determined using ASTM D 2216. The oil content was determined utilising a cold finger. The results of the analysis are summarised in Table 1 below (see column "Mill scale untreated").

The temperature of an indirect-fired rotary thermal reactor with three temperature zones was set to 100° C. in zone 1, 200° C. in zone 2 and 450° C. in zone 3. The reactor speed was set to 1 RPM and the angle was set to 1°.

Mill scale was fed into an indirect-fired rotary thermal reactor using a hopper with a live feed. 100 kg of mill scale were used. The feed rate was 25 kg/hr.

The material retention time in the heat zone was 40 minutes.

The processed material was collected and analysed as above to determine the percent composition of the treated mill scale (see Table 1 below, column "Mill scale treated").

The flue gas was fed to a two-stage recovery unit, wherein the first stage comprised an oil recovering assembly and the second stage comprised an oil and water condensing unit. The remaining flue gas was then passed through a coalescing oil filtration system.

The total material retention time was 65 minutes.

The results are summarised in Table 1. Table 1 compares the percent composition of the untreated mill scale with the percent composition of the treated mill scale.

TABLE 1

Percent content of each substance in untreated mill scale vs. treated mill scale

| Substance | Mill Scale Untreated (%) | Mill Scale Treated (%) |
| --- | --- | --- |
| Moisture | 16.0 | 0.07 |
| Oil | 5.28 | 0.24 |
| Iron Oxides | 47.9 | 66.5 |
| Aluminium Oxide | 2.35 | 1.66 |
| Calcium Oxide | 11.9 | 7.02 |
| Chromium Oxide | 0.37 | 0.17 |
| Copper Oxide | 0.09 | 0.11 |
| Lead Oxide | 0.01 | <0.05 |
| Magnesium Oxide | 3.83 | 2.24 |
| Manganese Oxide | 2.00 | 1.03 |
| Molybdenum Oxide | 0.02 | 0.03 |
| Nickel Oxide | 0.07 | 0.06 |
| Niobium Oxide | <0.05 | <0.05 |
| Phosphorus Oxide | 0.18 | 0.11 |
| Potassium Oxide | 0.13 | 0.08 |
| Silicon Dioxide | 14.5 | 14.1 |
| Sodium Oxide | 0.13 | 0.03 |
| Strontium Oxide | <0.01 | <0.01 |
| Titanium Oxide | 0.24 | 0.12 |
| Tungsten Oxide | <0.05 | 0.14 |
| Vanadium Oxide | 0.06 | 0.02 |
| Zinc Oxide | 0.25 | 0.27 |
| Zirconium Oxide | <0.05 | <0.05 |

The results in Table 1 clearly show that the treated mill scale has a reduced oil and water content. The treated mill scale has an oil content below 0.3% and a water content below 0.1%. Overall, Table 1 exemplifies how a unit and/or process according to the present invention results in recovering valuable iron oxides. Furthermore, Table 1 shows that the treated mill scale has water and oil contents low enough to allow the re-use of the treated mill scale in industrial processes.

The invention claimed is:

1. A process for treatment of mill scale containing hydrocarbons, wherein the process comprises:
  i) adding the mill scale as a feed material into an indirect-fired rotary thermal reactor, wherein the indirect-fired rotary thermal reactor is a multi-zone reactor with at least three different temperature zones;
  ii) heating the feed material in an oxygen-deficient atmosphere in each of the at least three temperature zones, wherein:
    a. a first temperature zone of the at least three different temperature zones is set to 93-149° C.;
    b. a second temperature zone of the at least three different temperature zones is set to 149-315° C.; and
    c. a third temperature zone of the at least three different temperature zones is set to 315-538° C.;
  iii) passing flue gas from the indirect-fired rotary thermal reactor through a pre-treatment duct, wherein the pre-treatment duct comprises an oil spray, wherein the oil spray is at a temperature of 120-150° C. and a velocity of the spray is at least 10000 fpm;
  iv passing vapour from the pre-treatment duct through a two-stage recovery unit comprising a first stage and a second stage, wherein:
    the first stage comprises an oil recovering assembly, the oil recovering assembly comprising an oil-based ejector style scrubber, a coalescing oil filtration unit, an oil mixing tank, a cooling unit, and an oil circulation assembly; wherein the vapour from the pre-treatment duct enters the oil-based ejector style scrubber; condensed liquid from the oil-based ejector style scrubber enters the coalescing oil filtration unit; and oil separated in the coalescing oil filtration unit enters the oil mixing tank; and
    the second stage comprises an oil and water condensing unit, wherein the oil and water condensing unit comprises a water-based ejector style scrubber, a water cooling and circulation assembly, and an oil and water collection tank with an oil-water separator; wherein the vapour from the oil-based ejector style scrubber of the first stage enters the water-based ejector style scrubber of the second stage; and condensed liquid from the water-based ejector style scrubber enters the oil and water collection tank;
  v) passing the vapour from the water-based ejector style scrubber through a coalescing oil filtration system; and
  vi) passing the vapour from the coalescing oil filtration system to a combustion chamber of the indirect-fired rotary thermal reactor.

2. The process according to claim 1, wherein the process provides iron oxides with an oil content less than 0.50% and a water content less than 2%.

3. The process according to claim 1, wherein the indirect-fired rotary thermal reactor has four temperature zones, wherein in a fourth temperature zone of the four temperature zones a temperature ranges up to 1002° C.

4. The process according to claim 1, wherein the process utilizes vaporized oil and carbon monoxide gained from the process as a supplemental fuel source.

5. The process according to claim 1, wherein the feed material is added using a hopper with a live bottom, wherein the feed is fed to the reactor with a constant volume of hydrocarbons.

6. The process according to claim 1, wherein there is no introduction of an inert gas.

7. The process according to claim 1, wherein controlled sweep gas is introduced into the rotary thermal reactor, and the sweep gas is steam or nitrogen.

8. The process according to claim 1, wherein the heating the feed material in the at least three temperature zones is carried out for at least 30 minutes.

9. The process according to claim 8, wherein the heating the feed material is carried out for at least 45 minutes.

10. The process according to claim 1, wherein the rotary thermal reactor is capable of processing material up to 1000° C.

11. The process according to claim 1, wherein the rotary thermal reactor comprises:
a sealed feed assembly having an airlock; and
a sealed discharge assembly having an airlock;
wherein the rotary thermal reactor is made of a high temperature alloy.

12. The process according to claim 1, wherein the material is processed in an oxygen-deficient atmosphere.

13. The process according to claim 11, wherein treated mill scale is discharged into a container through the airlock of the sealed discharge assembly, and wherein the airlock of the sealed discharge assembly is a double airlock.

14. The process according to claim 1, wherein oil condensed and separated in the first stage is recirculated through the oil circulation assembly.

15. The process according to claim 1, wherein water condensed and separated in the second stage is recirculated through the water cooling and circulation assembly.

16. The process according to claim 1, wherein step v) includes first passing the vapour from the water-based ejector style scrubber through one or more further scrubbers, wherein the one or more further scrubbers is fitted with a recirculating tank.

17. The process according to claim 1, wherein the oil recovering assembly removes at least 90% of oil from the vapour from the pre-treatment duct.

18. The process according to claim 1, wherein the oil and water condensing unit removes at least 80% of water from the vapour from the oil-based ejector style scrubber of the first stage.

19. The process according to claim 1, wherein a second flue gas produced in the combustion chamber contains less than 100 ppm of water and less than 100 ppm of oil after exiting the combustion chamber.

20. The process according to claim 1, wherein the oil spray used in the pre-treatment duct is oil condensed in the oil recovering assembly.

* * * * *

UNITED STATES PATENT AND TRADEMARK OFFICE
CERTIFICATE OF CORRECTION

PATENT NO. : 12,246,364 B2
APPLICATION NO. : 18/003255
DATED : March 11, 2025
INVENTOR(S) : Alexander Kehrmann et al.

Page 1 of 1

It is certified that error appears in the above-identified patent and that said Letters Patent is hereby corrected as shown below:

On the Title Page

Item (30) should be added after Item (65):
--(30) Foreign Application Priority Data:
Jun. 25, 2020 (WO).......PCT/EP2020/067833--.

In the Claims

<u>Column 16, Claim 1, Line 12:</u>
"iv passing" should read: --(iv) passing--.

Signed and Sealed this
Twenty-ninth Day of July, 2025

Coke Morgan Stewart
*Acting Director of the United States Patent and Trademark Office*